United States Patent Office 2,698,330
Patented Dec. 28, 1954

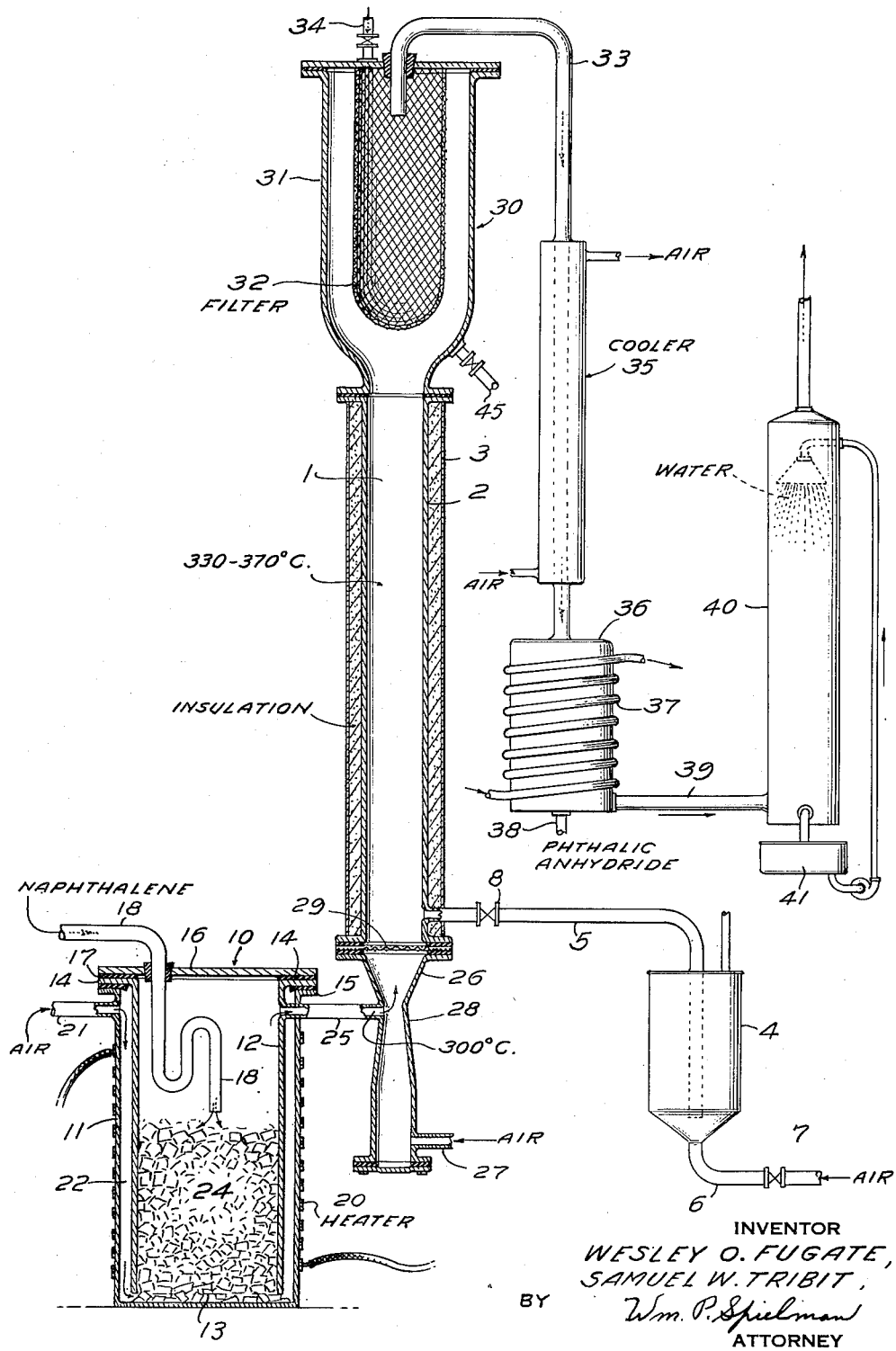

2,698,330

PRODUCTION OF PHTHALIC ANHYDRIDE AND ABRASION-RESISTANT FLUID CATALYST THEREFOR

Wesley O. Fugate, Stamford, Conn., and Samuel W. Tribit, Hawthorne, N. Y., assignors to American Cyanamid Company, New York, N. Y., a corporation of Maine Application December 8, 1950, Serial No. 199,784

10 Claims. (Cl. 260—346.4)

This invention relates to catalysts for the vapor phase air oxidation of naphthalene to phthalic anhydride, and more particularly to fluidized catalysts for this process. The invention includes the novel catalysts themselves, their methods of manufacture, and the catalytic oxidation of naphthalene by the fluidized catalyst technique wherein they are employed.

The adaptation of fluidized catalyst technique to the air oxidation of naphthalene for the production of phthalic anhydride presents a number of new problems. Foremost among these is the problem of abrasion and, in conjunction therewith, the problem of obtaining an abrasion-resistant catalyst of suitable activity having the necessary fine particle size. In fixed-bed catalytic oxidation processes the most effective catalysts were those wherein the catalytic material, usually vanadium pentoxide, was coated on the outer surfaces of relatively massive grains of a supporting material such as aluminum oxide, carborundum, silica and the like. In finely divided fluidized catalysts, however, this procedure presents the difficulty that most of the vanadium pentoxide coating would be removed by attrition of the fluidized catalyst particles. The present invention has as one of its principal objects the provision of highly active vanadium pentoxide-containing catalsyts possessing a high degree of abrasion resistance when used in fluidized form for the air oxidation of naphthalene to phthalic anhydride. A further object is the provision of reaction conditions; i. e., air-naphthalene ratios and contact times and temperatures, which when used in conjunction with the novel catalysts will produce a phthalic anhydride converter product of exceptional purity. Still further objects will become apparent from the following description of preferred features of the invention when taken with the claims appended thereto.

The process of our invention will be described in detail with reference to the accompanying drawing wherein the single figure is a diagrammatic illustration, with parts shown in section, of an apparatus suitable for the catalytic air oxidation of naphthalene by the fluidized catalyst technique. Referring to this drawing the catalyst chamber 1 consists of a vertical tube 2, which may be composed of stainless steel, calorized steel, or any other material capable of withstanding the reaction temperatures. Heating means in the form of electric strip heaters (not shown) may be attached to the outer surface of this tube to aid in maintaining suitable temperatures therein and also, as will be explained, for heating the catalyst during the calcination thereof. The tube 2 is preferably surrounded by a layer of insulation 3, which also surrounds the strip heaters when these are employed. In the particular embodiment illustrated the tube 2 has an internal diameter of 2 inches and contains from 2 to 2.5 kilograms of catalyst; however it will be understood that smaller or larger tubes may be employed. Thus, in full-scale manufacturing plants, reaction tubes having internal diameters of from 12 inches to several feet are contemplated, together with means for positive cooling of the reaction mixture to dispose of the much greater amounts of heat evolved.

The catalyst, in the form of a relatively fine powder having an average particle size between 40 and 150 microns, is held in the reservoir 4. Suitable quantities of this catalyst are introduced through pipe 5 into the reaction chamber 1 by injecting air into the reservoir 4 through line 6. Valves 7 and 8, which are open during the catalyst introduction, may be closed during the operation of the process if no catalyst circulation is employed. Preferably, as will be explained, a sufficient quantity of the catalyst dust is introduced in this manner to form a relatively dense catalyst bed about 5 feet in height in the tube 2.

An air-naphthalene mixture is prepared in the naphthalene vaporizer 10. This vaporizer consists of an outer cylindrical tank 11 containing an annular sleeve 12 that is open at its bottom end 13 and formed with an outturned flange 14 at its upper end to make an airtight fit with a similar flange 15 on the tank 11. A top closure 16 provided with gasket 17 fits across the flange 14, making an airtight joint therewith. A pipe 18 extends to the interior of the sleeve 12 through suitable packing in the top closure 16.

By means of an electric heater 20, or other suitable heating means, the outer walls of the tank 11 are heated to the extent necessary to give the desired amount of preheat to air entering through pipe 21. The air passes downwardly through the annular pipe 22 between the outer tank 11 and the inner sleeve 12, reverses its flow, and passes upwardly through packing 24 within the inner sleeve 12. Molten naphthalene is simultaneously introduced through the pipe 18 and spreads over the packing 24, where it is vaporized by the incoming air. The resulting air-naphthalene mixture passes through pipe 25 into a mixing chamber 26 at the base of the catalytic reaction chamber 1.

All of the air necessary to form a naphthalene-air mixture of suitable concentration for catalytic oxidation may be introduced through pipe 21, and under these circumstances the chamber 26 operates merely as a conical passageway to admit the reaction mixture to the catalyst chamber 1. However, when more concentrated naphthalene-air mixtures are prepared, additional air is introduced through the pipe 27 and passes upwardly through the Venturi 28. In either case, however, the naphthalene-air mixture is distributed through a screen 29 which performs the important function of producing both a uniform distribution and a streamlined flow of the naphthalene-air mixture into the base of the catalyst chamber 1. In this chamber, under the influence of the finely divided catalyst particles, the naphthalene is partially oxidized with the formation of a major proportion of phthalic anhydride together with minor quantities of maleic anhydride, carbon dioxide and water vapor.

The resulting mixture, which may contain entrained finely divided catalyst, passes from the top of the reaction tube 2 into a cooling and separating section 30. This portion of the converter consists of tube 31, of enlarged cross-sectional area as compared with that of the tube 2, containing a filter element 32 of unglazed ceramic material or other suitable material. Because of the larger cross-sectional area of the tube 31, the linear velocity of the gases therein is considerably reduced, as compared with their speed in the reaction vessel 1, which aids in settling out the major portion of entrained catalyst from the gases. The remainder of the catalyst is separated by passage of the gases through the filter 32, after which they leave through pipe 33. Compressed air or other gas may be injected periodically through the pipe 34 to remove any catalyst that may adhere to the filter.

The phthalic anhydride may be removed from the gases by any suitable means, as by contacting them directly with a spray of water or with an aqueous slurry of phthalic acid; however, the gases are preferably cooled to a temperature within the range of about 135°–160° C., or slightly above their dew point, in a jacketed cooler 35. The precooled gases then pass to condenser 36, preferably supplied with cooling coils 37 containing hydrocarbon oil or other cooling medium at a controlled temperature of about 40–90° C., wherein the major proportion of the phthalic anhydride condenses and is taken off to storage through pipe 38. The remaining gases, which contain maleic and uncondensed phthalic anhydrides, are passed through pipe 39 to a fume tower 40, where they contact a recirculating spray of aqueous maleic acid solution from the tank 41. By this means all of the maleic anhydride values in the converter product gases are recovered as an aqueous maleic acid solution.

It will be understood that in larger installations, such as those having a reaction tube 1 of one to three feet in diameter or larger, positive cooling means may be required to remove the heat given off by the reaction. Any suitable procedure may be employed for this purpose. Thus, for example, the vertical tube 2 may be surrounded by a concentric chamber containing a liquid, such as metallic mercury, that boils at or near the desired reaction temperature. Similarly, a non-boiling bath provided with air-cooling passages may be employed, as is frequently used for cooling fixed-bed converters in the catalytic oxidation of naphthalene. Preferably, however, a portion of the separated finely divided catalyst is withdrawn continuously from the cooling section 30, as through a tube 45, and cooled by indirect heat exchange with air, water or other cooling medium, after which it is reintroduced with additional air through the tube 5, the valve 8 remaining open. By this procedure a continuous recirculating stream of finely divided catalyst is maintained from the pipe 45, through the cooler, and through the pipe 5 into the base of the reaction chamber 1, and any desired proportion of the heat given off by the reaction can be removed thereby.

From the foregoing description it will be seen that the vapor phase catalytic oxidation of naphthalene by the fluidized catalyst technique introduces a number of fundamental differences from the fixed-bed operations that have heretofore been used. Some of these differences result in simplified operations, but others introduce complicating factors that are not encountered in the fixed-bed process. The differences may be summarized as follows:

1. The particle size of the catalyst is much finer than that used in fixed-bed operations. Moreover, this finely divided catalyst is in continuous motion, with the particles in constant collision. This results in continuous abrasion with the development of fines that may be carried through the filter 32 and contaminate the phthalic anhydride product.

2. The catalytic oxidation and heat evolution are relatively uniform throughout the length of the fluidized catalyst mass. There is no sharp temperature gradient, as is the case with a fixed catalyst bed having a "hot spot." This means, in turn, that the oxidation reaction may be carried out with a much lower temperature range than is found in fixed beds. Temperatures between 330° C. and 370° C. produce the best results. More highly active catalysts are therefore needed than those used in fixed bed processes.

We have succeeded in preparing catalysts which, when used in the process described above, produce exceptionally high yields of a highly pure phthalic anhydride converter product. We have found that this combination of high purity of phthalic anhydride converter product with high yields, which under the most favorable conditions may amount to more than the weight of the naphthalene oxidized, is obtained by using catalysts composed of a calcined gel of silica that is impregnated uniformly with an active vanadium catalyst such as a vanadium oxide and also with a potassium sulfate, the catalyst being activated by small quantities of either silver oxide or a cerium oxide or by a mixture of oxides of these two metals. We regard the uniformly impregnated silica catalysts of this type, having the compositions hereinafter described, as new compositions of matter constituting an important feature of our invention, particularly when they are prepared in the form of fine particles suitable for use by the fluidized catalyst technique.

We have also discovered a method for the preparation of uniformly impregnated silica catalysts which produces increased toughness or resistance to abrasion by the constant collision and attrition that exists in a fluidized bed of finely divided catalyst. This increased abrasion resistance, which in the preferred practice of our process is accompanied by increased mechanical strength, is obtained by first preparing a relatively dilute aqueous silica dispersion having the potassium sulfate and the vanadium catalyst-forming material dissolved therein and concentrating this dispersion by boiling to a solids content within the range of from about 12–15% to about 35%. This procedure also results in a catalyst of homogeneous composition so that if an external surface is rubbed or broken away the underlying portion has equal activity. It will be understood that our novel method is general in character and can be applied to the preparation of silica-potassium sulfate-vanadium oxide catalysts containing no promoter, or containing promoters other than the silver oxide and cerium oxide referred to above.

The dilute aqueous silica dispersion is preferably prepared from a potassium silicate solution, which can be reacted with aqueous sulfuric acid to form both the gelatinous silica and the potassium sulfate needed in the catalyst. If desired a vanadium compound such as potassium or ammonium vanadate may be added to the potassium silicate solution before reacting it with the sulfuric acid. The concentrations of the sulfuric acid and the potassium silicate solution are adjusted so that their reaction produces a dilute suspension of from 3 to about 10 parts by weight of silica in about 97 to 90 parts of water. Water-soluble salts of copper, nickel, tin, aluminum or other catalyst ingredients may be added to this suspension if desired in amounts such as to produce a concentration of 0.05% to 5% of the corresponding metal oxide in the finished catalyst. However, as has been explained, much better results are obtained by adding the same quantities of cerium or silver or mixtures thereof in the form of their water-soluble salts.

Another feature of our invention, which increases still further the toughness of the silica catalysts, resides in the step of conditioning the dilute silica slurry for a period of from about 30 minutes to 2 hours at a temperature within the range of about 50–85° C. with continuous agitation. This conditioning step may be carried out either before or after adding the water-soluble vanadium salt that forms the active catalyst, or the vanadium salt may be added during the conditioning procedure. Water-soluble salts of metals which, in the form of their oxides, will function as promoters may also be added either before or during or after the heating or conditioning step. It will be understood that the potassium sulfate may also be added during or after the conditioning if desired; however, since this material is usually formed in situ, it is ordinarily present during the conditioning step.

In general, sufficient quantities of a water-soluble vanadium salt capable of producing a vanadium oxide upon final calcination of the catalyst are employed to produce a content of about 3% to 25% by weight of $V_2O_5$ in the finished catalyst, the preferred quantity being about 8–15%. Suitable compounds are ammonium vanadate, potassium vanadate, vanadyl sulfate and the like. The optimum quantities of potassium sulfate in the catalyst compositions are from about 20% to about 50%, calculated as potassium pyrosulfate and based on the calcined weight of the catalyst, the preferred quantity being about 46–47%. The optimum amounts of silver oxide and cerium oxide promoters are from about 0.05% to about 5% by weight; in catalysts containing about 10% of vanadium pentoxide the best results are obtained with about 0.2–2% by weight of these promoters.

Our improved catalysts are therefore obtained by first preparing an aqueous dispersion containing gelatinous silica, such as a silica hydrogel, at relatively high dilutions such as at a solids content of about 3–10% of silica by weight. This is preferably accomplished by reacting an aqueous potassium silicate with aqueous sulfuric acid at dilutions such as to obtain the desired concentration of gelatinous silica, since by this procedure about 2% to 15% of potassium sulfate is also produced in the solution. By impregnating this dilute silica-potassium sulfate dispersion with the requisite quantities of ammonium vanadate or other suitable water-soluble vanadium compound, together with promoters or other catalyst ingredients if desired, and by heating the dispersion and conditioning it at an elevated temperature, we produce a catalyst gel having a high degree of toughness and abrasion resistance. Preferably the aqueous slurry, containing all of the catalyst ingredients, is heated with continuous agitation for 0.5 to 2 hours at 50–85° C. after which the temperature is raised to the boiling point of the solution at atmospheric pressure and concentrated by boiling to the degree that will produce a gel of the desired toughness. This is accomplished when the dispersion is boiled to a solids content within the range of from about 12–15% to about 35%.

The fluid gel is then preferably spread out in thin layers and dried, as in a Procter-Schwartz drier, after which it may be calcined at temperatures up to 500° C. and ground to the desired particle size. Conveniently, the calcination may be carried out in the catalytic reactor itself, as by injecting the dried and ground catalyst into the reaction tube 2 by means of a stream of air while maintaining a temperature of about 400° C. therein by operation of the strip heaters. Alternatively, if spherical catalyst particles are desired, the fluid gel having the above-described solids content of 12–35% may be sprayed into hot products of combustion having a temperature of 600°–800° F. by any of the standard spray drying procedures.

The invention will be described in greater detail by the following specific examples. It should be understood, however, that although these examples may describe certain features of the invention they are given primarily for purposes of illustration and the invention in its broader aspects is not limited thereto.

*Example 1*

A solution of 953 parts by weight of 30° Bé. potassium silicate in 2200 parts of water was prepared and heated to 40–50° C. This solution was agitated violently while 920 parts by weight of 17% sulfuric acid of about the same temperature were added rapidly. Sufficient concentrated ammonium hydroxide (180 parts by weight of 26% NH₄OH) was added to adjust the pH to 8–9. The resulting gel was maintained at 65–80° C. and agitated while a solution of 57 parts by weight of NH₄VO₃ in 800 parts of water was added followed by the addition of a solution of 2.5 parts by weight of cerous nitrate (Ce(NO₃)₃.6H₂O) in 100 parts of water. The heating and agitation was continued at the same temperature for a total of 1 hour.

The impregnated gel was then heated to its boiling point and concentrated by boiling with agitation to about two-thirds of its original volume. It was then poured into pans and oven-dried at 110–125° C. during about 48 hours. The resulting mass was calcined at 450° C. for about 8–10 hours and ground to the following particle size distribution:

|  | Per cent |
|---|---|
| +100 mesh | 5–10 |
| −100+200 mesh | 30–40 |
| −200+325 mesh | 30–40 |
| −325 mesh | 20–25 |

The finished catalyst contained 42.6% by weight of silica, 10.2% of $V_2O_5$, 46.7% of $K_2S_2O_7$ and 0.3% of $CeO_2$.

A quantity of this catalyst weighing 2200 grams was blown into the tube 2 shown on the attached drawing and a naphthalene-air mixture was passed over it at temperature of 330–37° C. using linear gas velocities of from 1 to 1.7 feet per second. This reaction gas mixture was introduced through the pipe 25 at about 300° C., the desired reaction temperature being maintained by the exothermic nature of the reaction with the aid of the electric strip heaters. Air to naphthalene ratios of from 1 to 2 mol percent of naphthalene in air were used, corresponding to 11–22 grams of air per gram of naphthalene. The bed height may be varied within wide limits by suitable temperature regulation. Catalyst bed depths of from three to ten feet were tested and it was found that a fluidized bed approximately five feet deep, with contact times of 5 to 8.5 seconds, produced the best results.

When a gas mixture containing 1.5 mol per cent of naphthalene was used a product was obtained in the condenser 36 that was practically colorless. This is a very unusual result in catalytic naphthalene oxidation since most converter products range in color from pink to red. Upon distilling this product a pure phthalic anhydride was obtained with a distillation residue of only 1.35% of the initial quantity. The yield of converter product was slightly more than the weight of the naphthalene oxidized and this constitutes another remarkable improvement over the yields obtained commercially with fixed-bed catalysts, which are usually on the order of 80–85% of the weight of the naphthalene.

This catalyst has been used continuously under the conditions outlined above over periods of several weeks without exhibiting any decline in its catalytic activity and without substantial loss through abrasion. The abrasion resistance of the catalyst is therefore excellent.

*Example 2*

A solution of 31 lbs. of 30° Bé. potassium silicate in 66 lbs. of water was prepared and heated to 45° C. The solution was agitated strongly while 30.5 lbs. of 17% sulfuric acid was added rapidly. Sufficient concentrated ammonium hydroxide (about 2500 cc.) was then added to bring the pH to 8 to 9 and form a viscous gel that was diluted with 16.6 lbs. of water.

The temperature of the batch was raised to 75° C. and solutions of 855 grams of ammonium metavanadate in 26.4 lbs. of boiling water and 138 grams of silver nitrate in 500 cc. of water were added, bringing the total volume to about 19 gallons, and the batch was maintained at this temperature for 45 minutes. Water was then evaporated by boiling until the volume was 10 gallons, after which the gel was transferred to trays and dried at 110° C. for 48 hours. The catalyst was finally ignited for 8–10 hours at 450° C., ground and sized to the particle size distribution described in Example 1. The calcined catalyst contained 42.1% by weight of silica, 10.1% of $V_2O_5$, 46.3% of $K_2S_2O_7$ and 1.4% of $Ag_2O$.

When tested under the conditions described in Example 1 this catalyst also produced a colorless converter product with yields greater than the amount of naphthalene charged. The abrasion resistance of the catalyst was excellent. Upon distilling the phthalic anhydride produced by this catalyst in a reaction tube 2 inches in diameter at reaction temperatures of 350–375° C. the following fractions were obtained, the percentage being based on the weight of converter product charged to the still.

| Naphthalene in Converter Feed | Distillate | Residue |
|---|---|---|
| 2% | 98.5 | 1.5 |
| 1.5% | 98.7 | 1.35 |

*Example 3*

A solution of 953 grams of 30° Bé. potassium silicate was dissolved in 2200 cc. of water and 57 grams of powdered ammonium metavanadate were added to the silicate solution. The solution was then heated to 40–50° C., agitated, and 920 grams of 17% sulfuric acid added rapidly. The pH was adjusted to 8 to 9 with concentrated ammonium hydroxide. The resulting gel was maintained at 65–80° C. and a solution of 2½ grams of copper nitrate in 100 cc. of water was added. The gel was then heated to the boiling point and concentrated with agitation to about ⅔ of its original volume. It was then poured into pans and dried at 110–125° C. The resulting mass was calcined at 450° C. for about 8–10 hours and ground to the appropriate particle size distribution. The resulting catalyst had good activity and good abrasion resistance when tested with a 29:1 naphthalene-air mixture in a fluidized bed at 370° C. as described in the preceding examples.

*Example 4*

A solution of 630 grams of 30° Bé. potassium silicate solution in 1800 cc. of water was prepared and 45 grams of powdered potassium metavanadate were added with agitation at room temperature. When solution was complete the agitation was continued while 680 grams of 17% sulfuric acid were added rapidly. The pH was then adjusted to a value between 8 and 9 by adding ammonium hydroxide.

The resulting gel was heated with agitation for 10 minutes at 65–90° C. and was then boiled at atmospheric pressure for about 1 hour, or until its solids content was increased to 25–30%. It was then oven dried in thin layers at 110–125° C. and ground to approximately the particle size distribution shown in Example 1. The ground gel was blown into the reactor 1 shown on the drawing and heated to temperatures of 300–450° C. by means of the strip heaters while a current of air sufficient to keep it in fluidized condition was introduced through the inlet 27. This calcination was continued for about 6–8 hours, or until all of the ammonium vanadate was converted to $V_2O_5$. A naphthalene-air mixture containing 18 grams of air per gram of naphthalene was then introduced through the pipe 25 at a temperature of approximately 300° C., the temperature of the catalyst in the reaction zone being maintained at 350–360° C. and the gas velocity being such that the contact time in the fluidized bed was 5.7 seconds. After two weeks initial operation conversion yields of 90–95 pounds of phthalic anhydride per 100 pounds of naphthalene vaporized were obtained, and the catalyst showed a good degree of abrasion resistance.

What we claim is:

1. A catalyst in the form of fine particles suitable for the catalytic oxidation of naphthalene to phthalic anhydride by the fluidized catalyst technique, said particles being composed of about 40% to 75% by weight of a calcined gel of silica impregnated uniformly with about 20% to 50% of a potassium sulfate, about 3% to 25% of a vanadium oxide and from 0.05% to about 5% of an oxide of a metal selected from the group consisting of silver and cerium, all percentages being based on the calcined weight of the catalyst.

2. A catalyst in the form of fine particles suitable for the catalytic oxidation of naphthalene to phthalic anhydride by the fluidized catalyst technique, said particles being composed of about 42% by weight of a calcined gel of silica impregnated uniformly with about 46–47% of a potassium sulfate, about 10% of vanadium pentoxide and about 0.2–2% of an oxide of a metal selected from the group consisting of silver and cerium, all percentages being based on the calcined weight of the catalyst.

3. A method of producing a catalyst having both high activity and abrasion resistance in the vapor phase catalytic oxidation of naphthalene by the fluidized catalyst technique which comprises preparing a dispersion of from about 3 to about 10 parts by weight of a gelatinous silica carried in an aqueous solution containing about 97 to 90 parts by weight of water and about 2–15 parts by weight of a potassium sulfate together with sufficient water-soluble vanadium salt to produce a content of about 3% to 25% by weight of $V_2O_5$ in the finished dry catalyst, heating said dispersion to boiling, and concentrating it by boiling to a solids content within the range of from about 12–15% to about 35%, and drying and grinding the resulting gel.

4. A method of producing a catalyst having both high activity and abrasion resistance in the vapor phase catalytic oxidation of naphthalene by the fluidized catalyst technique which comprises preparing a dispersion of from about 3 to about 10 parts by weight of a gelatinous silica carrier in an aqueous solution containing about 97 to 90 parts of water and about 2–15 parts by weight of a potassium sulfate together with sufficient water-soluble vanadium salt to produce a content of about 3% to 25% by weight of $V_2O_5$ in the finished dry catalyst, heating said dispersion with agitation for about 0.5–2 hours at about 50–85° C., then heating the dispersion to boiling and concentrating it by boiling to a solids content within the range of from about 12–15% to about 35%, and drying and grinding the resulting gel.

5. A method of producing a catalyst having both high activity and abrasion resistance in the vapor phase catalytic oxidation of naphthalene by the fluidized catalyst technique which comprises reacting an aqueous potassium silicate solution with a chemically equivalent quantity of sulfuric acid, the concentration of the reagents being such as to produce a dispersion containing from about 3 to about 10 parts by weight of gelatinous silica for each 97 to 90 parts of water, agitating said dispersion for about 0.5–2 hours at about 50–85° C. while introducing a sufficient quantity of a water-soluble vanadium salt to produce a content of about 3% to 35% of $V_2O_5$ in the finished dry catalyst, heating the dispersion to boiling and concentrating it by boiling to a solids content within the range of from about 12–15% to about 35%, and drying and grinding the resulting gel.

6. A method according to claim 5 in which a water-soluble salt of a promoter metal is added to the dispersion along with the vanadium compound, the amount of said salt corresponding to 0.05% to 5% of the oxide of the promoter metal based on the $V_2O_5$ content of the catalyst.

7. A method according to claim 6 in which the promoter is a cerium oxide.

8. A method according to claim 6 in which the promoter is silver oxide.

9. A method for the vapor phase catalytic oxidation of naphthalene to phthalic anhydride which comprises passing a mixture of naphthalene vapor and air having a ratio of about 1 to 2 mol percent of naphthalene in air through a fluidized mass of particles of finely divided vanadium oxide catalyst maintained at a temperature between 330° and 370° C., said catalyst being composed of about 40% to 75% by weight of a calcined gel of silica impregnated uniformly with about 20% to 50% of a potassium sulfate, about 3% to 25% of a vanadium oxide and from 0.05% to about 5% of an oxide of a metal selected from the group consisting of silver and cerium, all percentages being based on the calcined weight of the catalyst.

10. A method for the vapor phase catalytic oxidation of naphthalene to phthalic anhydride which comprises passing a mixture of naphthalene vapor and air having a ratio of about 1 to 2 mol percent of naphthalene in air through a fluidized mass of particles of finely divided vanadium oxide catalyst maintained at a temperature between 330° and 370° C., said catalyst being composed of about 42% by weight of a calcined gel of silica impregnated uniformly with about 46–47% of a potassium sulfate, about 10% of a vanadium pentoxide and about 0.2–2% of an oxide of a metal selected from the group consisting of silver and cerium, all percentages being based on the calcined weight of the catalyst.

References Cited in the file of this patent

UNITED STATES PATENTS

| Number | Name | Date |
|---|---|---|
| 1,692,126 | Jaeger | Nov. 20, 1928 |
| 1,893,812 | Weil | Jan. 10, 1933 |
| 1,909,354 | Jaeger | May 16, 1933 |
| 2,027,316 | Johnson | Jan. 7, 1936 |
| 2,425,398 | Ruthruff | Aug. 12, 1947 |
| 2,453,740 | Becker | Nov. 16, 1948 |
| 2,504,001 | Connolly | Apr. 11, 1950 |
| 2,510,803 | Cooper | June 6, 1950 |